(12) United States Patent
Kang et al.

(10) Patent No.: US 8,902,177 B2
(45) Date of Patent: Dec. 2, 2014

(54) TOUCH SCREEN PANEL AND FABRICATING METHOD THEREOF

(75) Inventors: Sung-Ku Kang, Yongin (KR); Byeong-Kyu Jeon, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 510 days.

(21) Appl. No.: 12/926,758

(22) Filed: Dec. 8, 2010

(65) Prior Publication Data

US 2011/0242018 A1 Oct. 6, 2011

(30) Foreign Application Priority Data

Apr. 1, 2010 (KR) .................. 10-2010-0029946

(51) Int. Cl.
| | |
|---|---|
| *G06F 3/041* | (2006.01) |
| *G06F 3/044* | (2006.01) |
| *C03C 15/00* | (2006.01) |
| *C03C 21/00* | (2006.01) |

(52) U.S. Cl.
CPC .............. *C03C 15/00* (2013.01); *G06F 3/044* (2013.01); *G06F 3/041* (2013.01); *C03C 21/002* (2013.01); *G06F 2203/04103* (2013.01)
USPC ...................................................... 345/173

(58) Field of Classification Search
USPC ................................................ 345/173–174
See application file for complete search history.

(56) References Cited

U.S. PATENT DOCUMENTS

| | | | | |
|---|---|---|---|---|
| 4,448,637 | A  * | 5/1984 | Hiraishi et al. ................. | 216/23 |
| 8,568,600 | B2 | 10/2013 | Kang et al. | |
| 2004/0217945 | A1* | 11/2004 | Miyamoto et al. ............ | 345/173 |
| 2009/0046240 | A1* | 2/2009 | Bolton .......................... | 349/158 |
| 2010/0119846 | A1* | 5/2010 | Sawada ........................ | 428/426 |
| 2010/0182267 | A1* | 7/2010 | Lee et al. ....................... | 345/173 |
| 2010/0214260 | A1* | 8/2010 | Tanaka et al. ................. | 345/174 |
| 2010/0279514 | A1* | 11/2010 | Herman et al. ............... | 438/761 |

FOREIGN PATENT DOCUMENTS

| | | |
|---|---|---|
| JP | 3131579 U | 4/2007 |
| KR | 10-0893498 B1 | 4/2009 |
| KR | 10-0894310 B1 | 4/2009 |
| KR | 10-2010-0006987 A | 1/2010 |
| KR | 10-1040789 | 6/2011 |

OTHER PUBLICATIONS

Korean Office Action in KR-2010-0029946, dated Sep. 29, 2011 (Kang, et al.)

* cited by examiner

*Primary Examiner* — Quan-Zhen Wang
*Assistant Examiner* — Tony Davis
(74) *Attorney, Agent, or Firm* — Lee & Morse, P.C.

(57) ABSTRACT

A method of fabricating a touch screen panel, a touch screen panel, and a display device, the method including performing a reinforcing process on whole surfaces of a glass substrate in preparation for forming a plurality of touch screen panels; cutting the reinforced glass substrate into unit cells; performing a healing process on an unreinforced cutting section of the glass substrate exposed after the cutting; and forming the touch screen panels in the unit cells.

8 Claims, 2 Drawing Sheets

Display Panel Direction

TOUCH SCREEN PANEL AND FABRICATING METHOD THEREOF

BACKGROUND

1. Field

Embodiments relate to a touch screen panel and a fabricating method thereof.

2. Description of the Related Art

A touch screen is an input device enabling a person to select an instruction displayed on a screen of an image display device with his/her finger or a tool and to input a user command.

To this end, the touch screen may be provided in a front face of the image display device and may convert a contact position on the screen with which a finger or a tool directly contacts into an electrical signal. By doing so, an instruction selected at the contact position may be input as an input signal.

The touch screen may be suitable for a range of applications because the touch screen may be a substitute of a separated input device, e.g., a keyboard and a mouse, that are coupled to an image display device.

In a conventional touch screen, a sensing cell may be formed on a glass substrate, wherein the glass substrate is implemented by a reinforced glass substrate in order to secure sufficient strength.

SUMMARY

Embodiments are directed to a touch screen panel and a fabricating method thereof, which substantially overcome one or more of the problems due to the limitations and disadvantages of the related art.

It is a feature of an embodiment to provide a touch screen capable of guaranteeing sufficient breaking strength and mass productivity, by reinforcing the glass substrate in its original or uncut state and by healing unreinforced surfaces of the glass substrate after cutting the glass substrate, that is, cross-sections of the cut glass substrate that are not reinforced, and a method of fabricating the same.

At least one of the above and other features and advantages may be realized by providing a method of fabricating a touch screen panel, the method including performing a reinforcing process on whole surfaces of a glass substrate in preparation for forming a plurality of touch screen panels to produce a reinforced glass substrate; cutting the reinforced glass substrate into unit cells; performing a healing process on an unreinforced cutting section of the glass substrate exposed after the cutting; and forming the touch screen panels in the unit cells.

Performing the healing process may include providing a viscous etching paste to a region of the glass substrate including the unreinforced cutting section to wrap the unreinforced cutting section; and heating the etching paste.

The etching paste may include at least one of $SiO_2$, $SiO_xN_y$, and $NH_4HF_2$.

Forming the touch screen panels in the unit cells may include sequentially forming X-sensing patterns, Y-sensing patterns, a second insulating layer, a first bonding layer, a buffer layer, and a ground electrode layer on each of the unit cells of the reinforced original glass substrate.

The reinforcing process may include soaking the glass substrate into a $KNO_3$ solution, and heating the $KNO_3$ solution at about 400° C. to about 450° C. for about 15 to about 18 hours.

The reinforcing process may include replacing a sodium component in the glass substrate with a potassium component.

At least one of the above and other features and advantages may also be realized by providing a touch screen panel including a glass substrate having a first surface and a second surface including reinforcing layers thereon; sensing patterns on the first surface of the glass substrate; and an insulating layer covering the sensing patterns; wherein the glass substrate includes an edge portion, the edge portion having a rounded shape on an unreinforced surface exposed at a side of the glass substrate.

The glass substrate including the reinforcing layer thereon may be a window substrate disposed uppermost among substrates to be included in an image display device.

The touch screen panel may further include a ground electrode layer facing a bonding layer on a side of the insulating layer.

At least one of the above and other features and advantages may also be realized by providing an image display device including a glass substrate having a first surface and a second surface including reinforcing layers thereon; sensing patterns on the first surface of the glass substrate; an insulating layer covering the sensing patterns; and a display panel disposed adjacent to the insulating layer, the display panel being disposed at an opposite side of the insulating layer from the side having the sensing patterns, wherein the glass substrate includes an edge portion, the edge portion having a rounded shape and an unreinforced surface exposed at a side of the glass substrate.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
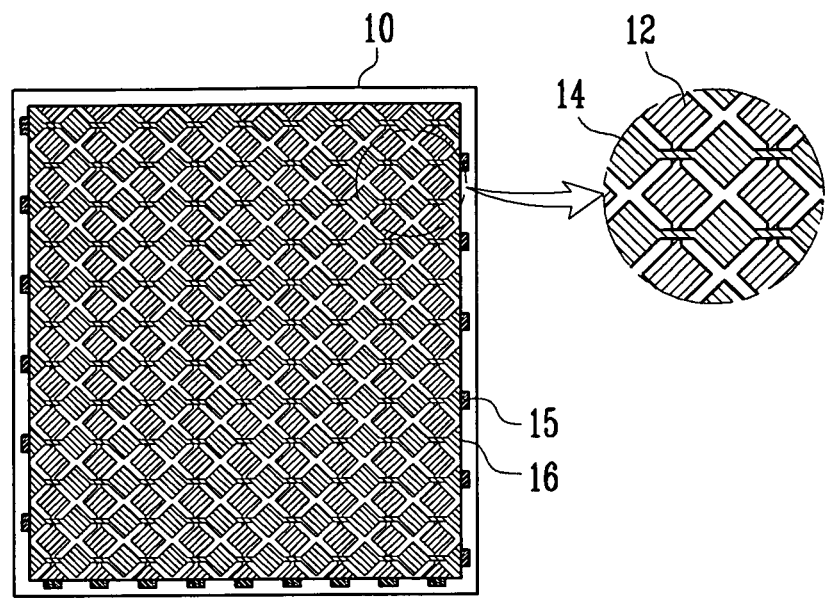
FIG. 1 illustrates a plan view of a touch screen panel according to an embodiment.

Korean Patent Application No. 10-2010-0029946, filed on Apr. 1, 2010, in the Korean Intellectual Property Office, and entitled: "Touch Screen Panel and Fabricating Method for the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, the embodiments will be described in detail with reference to FIGS. 1 to 3.

FIG. 1 illustrates a plan view of a touch screen panel according to an embodiment.

FIG. 1 illustrates a touch screen panel in which sensing patterns are formed on a glass substrate. The glass substrate may go through a reinforcing process in its original or uncut state, a plurality of touch screen panel may be fabricated on the glass substrate, and the glass substrate may be cut into several unit cells.

Referring to FIG. 1, the touch screen panel according to an embodiment may include a plurality of sensing patterns 12 and 14 formed on a reinforced glass substrate 10, metal patterns 15 coupling the sensing patterns 12 and 14 to a position detecting line (not illustrated), and an insulating layer 16 covering the sensing patterns 12 and 14.

The sensing patterns 12 and 14 may include X-sensing patterns 12 and Y-sensing patterns 14 in which X-coordinates and Y-coordinates are alternately arranged and connected to a single same row and to a single same column respectively.

For example, the X-sensing patterns 12 may include a plurality of X-patterns in which X-coordinates are connected to sensing patterns that are arranged in a single same row in a first direction (a row direction). The Y-sensing patterns 14 may include a plurality of Y-patterns in which Y-coordinates are connected to sensing patterns that are arranged in a single same column in a second direction (a column direction).

The X- and Y-sensing patterns 12 and 14 may include a separate insulating layer (not shown) interposed therebetween and may be formed on different layers.

In this case, the X-sensing patterns 12 may be patterned to be connected to each other in the first direction and the Y-sensing patterns 14 may be patterned to be connected to each other in the second direction during patterning. Accordingly, a process of forming a separate contact hole and connecting patterns may be omitted so that a number of masks is reduced and whole process may be simplified.

However, this is only one of embodiments and the embodiments are not limited thereto.

For example, the X- and Y-sensing patterns 12 and 14 may be formed on the same layer. In this case, any ones of the X- and Y-sensing patterns 12 and 14 may be connected in the first direction or in the second direction during the patterning process and the remaining sensing patterns may be connected in the first direction or in the second direction during a contact hole and connecting pattern forming process.

The metal patterns 15 may be arranged in an edge portion of a region on which the X- and the Y-sensing patterns 12 and 14 are formed. The metal patterns 15 may couple the X- and the Y-sensing patterns 12 and 14 to a position detecting line (not shown).

More specifically, the metal patterns 15 may electrically couple single row or column unit X- and Y-sensing patterns 12 and 14 to respective position detecting lines such that a contact position detecting signal may be supplied to a driving circuit.

The insulating layer 16 may be made of a transparent insulating material for covering the sensing patterns 12 and 14.

The above-mentioned touch screen panel may be a capacitive touch screen panel. In the touch screen panel, when an object, e.g., a finger or a touch stick, contacts the touch screen panel, change of electrostatic capacity generated at the contact position may be transmitted from the sensing patterns 12 and 14 to the driving circuit via the metal patterns 15 and the position detecting lines. The change of the electrostatic capacity may be converted into an electric signal by an X-input processing circuit and a Y-input processing circuit (not shown) so that the contact position may be sensed.

The glass substrate on which the sensing patterns 12 and 14 are formed may be reinforced; and the reinforced glass substrate may serve as a window. However, in an implementation, the sensing patterns 12 and 14 may be arranged toward a display panel (not shown).

That is, when it is assumed that the display panel is positioned under the touch screen panel and a contact surface is an upper surface of the touch screen panel, the sensing patterns 12 and 14 may be formed on the lower surface of the reinforced glass substrate 10.

Therefore, an upper surface of the reinforced glass substrate 10 may be an uppermost surface of a display device and may serve as the contact surface with which the contacting object contacts and may function as a display window of a display device. In this case, the glass substrate of the touch screen panel may be integrated with a window without a separate window, so that a thin touch screen panel may be realized and that fabrication efficiency may be improved due to a simple manufacturing process and reduction of material costs.

However, the embodiments are not limited thereto. That is, the embodiments are not limited to the reinforced glass substrate serving as a window.

In an embodiment, the reinforcement of the glass substrate 10 may not be performed on the respective individual cell units, but rather to the original or uncut glass substrate prior to cutting the original glass substrate into the unit cells.

In addition, when the reinforced original glass substrate is cut into the unit cells, cutting sections, i.e., unreinforced exposed surfaces of the cutting glass substrate, may exist. In the present embodiment, a healing process may be performed on the cutting sections to remove minute cracks in the sections so that breaking strength and mass productivity of the touch screen panel may be guaranteed.

Figure 2:
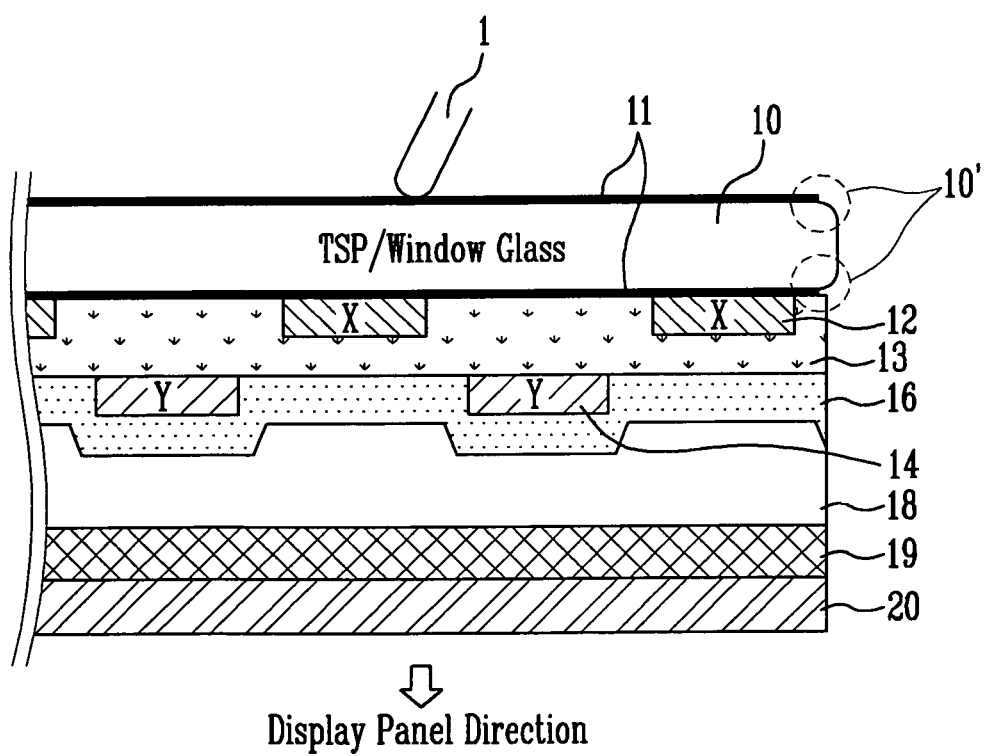
FIG. 2 illustrates a sectional view of a main part of the touch screen panel of FIG. 1.

FIG. 2 illustrates a sectional view of a main part of the touch screen panel according to an embodiment.

In particular, FIG. 2 illustrates an embodiment in which the reinforced glass substrate is used as a window, but the embodiments are not limited thereto.

Referring to FIG. 2, the touch screen panel according to the present embodiment may include the sensing patterns 12 and 14, a second insulating layer 16, a first bonding layer 18, a buffer layer 19, and a ground electrode layer 20, which are sequentially formed on a surface of a reinforced glass substrate, that is, a glass substrate 10 on which a reinforcing layer 11 is formed.

The surface of the glass substrate 10, on which the sensing patterns 12 and 14, the second insulating layer 16, the first bonding layer 18, and the ground electrode layer 20 are formed is a surface, e.g., a lower surface facing the display panel. The other surface of the glass substrate 10 may be arranged in a direction where the contacting object 1 contacts. That is, the glass substrate 10 may be integrated with the window.

The sensing patterns 12 and 14 may include the first transparent insulating layer 13 interposed therebetween and may be arranged on different layers in an alternate fashion. However, the embodiments are not limited to this and the sensing patterns 12 and 14 may be arranged in the same layer.

The sensing patterns 12 and 14 may be made of, e.g., a transparent electrode material such as ITO, such that light emitted from the display panel disposed under the touch screen panel may pass through the touch screen panel. The sensing patterns 12 and 14 may be covered with a second transparent insulating layer 16.

The first bonding layer 18 may be formed between the second insulating layer 16 and the ground electrode layer 20 and may bond the same to each other. The first bonding layer 18 may be made of a transparent bonding material having high light transmission. For example, the first bonding layer 18 may be made of super view resin (SVR) or optically clear adhesive (OCA).

The ground electrode layer 20 may be made of, e.g., a transparent electrode material such as ITO, and may face the second insulating layer 16 by including the first bonding layer 18 interposed therebetween. The ground electrode layer 20 may, e.g., guarantee stability between the touch screen panel and the display panel or to form an electrostatic capacity in association with the sensing patterns 12 and 14 according to the design of the touch screen panel.

That is, in the capacitive touch screen panel, the electrostatic capacity between the X- and Y-sensing patterns 12 and 14 and the ground electrode layer 20 may be used to sense the contact position.

In addition, a buffer film 19 may be further formed between the first bonding layer 18 and the ground electrode layer 20. That is, the buffer film 19 may be formed on the lower surface (a surface facing the display panel) of the first bonding layer 18 and may be attached to the touch screen panel. The buffer film 19 may be formed between the first bonding layer 18 and the ground electrode layer 20 and may be made of polymer, e.g., polyethylene terephthalate (PET), to improve durability of the touch screen panel by preventing scattering. In addition, the buffer film 19 may increase sensitivity of the touch screen panel.

In particular, when the buffer film 19 is provided, the distance between the sensing patterns 12 and 14 and the ground electrode layer 20 may be increased and the electrostatic capacity generated therebetween may be decreased. Therefore, since the touch screen panel may react against a contact at the same level more sensitively, a high sensitivity touch screen panel may be achieved.

The ground electrode layer 20 may not be provided in the touch screen panel but rather on a surface of the display panel that is coupled to the touch screen panel.

In the present embodiment, reinforcement of the glass substrate 10 may be performed.

The reinforcement of the glass substrate 10 may be performed by, e.g., a process of soaking the glass substrate 10 in a $KNO_3$ solution and heating the same at about 400° C. to about 450° C. for about 15 to about 18 hours. By performing the process, a sodium (Na) component existing on the surface of the glass substrate 10 may be replaced with potassium (K) component so that a strength of the surface of the glass substrate may be improved.

That is, in a reinforcing layer 11 on the surface of the reinforced glass substrate 10, the sodium (Na) component that existed on the surface of the glass substrate may be replaced with the potassium (K) component so that the strength of the glass substrate 10 may be improved.

Typically, reinforcement of a glass substrate may be performed by cutting the glass substrate into unit cells and by performing the reinforcement on the unit cells independently. Then, a touch screen panel may be attached to the reinforced glass substrate to fabricate a touch screen. However, mass productivity of the touch screen panel may not be achieved by such a fabricating method.

Therefore, in the present embodiment, the reinforcement of the glass substrate 10 may not be performed on the individual unit cells, but rather on an original or uncut glass substrate prior to cutting the original glass substrate into the unit cells.

In addition, cutting sections, i.e., unreinforced exposed surfaces of the glass substrate, may be formed after the cutting when the reinforced original glass substrate is cut into the unit cells. In the present embodiment, the healing process may be performed on the cutting sections such that minute cracks generated in the cutting sections may be removed to secure breaking strength and mass productivity of the touch screen panel.

As illustrated in FIG. 2, a healing process may be performed on lateral surfaces of the glass substrate 10 so that edges 10' thereof have a rounded shape.

Hereinafter, a fabricating method of a touch screen panel according to an embodiment will be described in detail with reference to FIG. 3.

FIGS. 3A to 3D illustrate sectional views of stages in the fabricating method of a touch screen panel according to an embodiment.

Figure 3A:
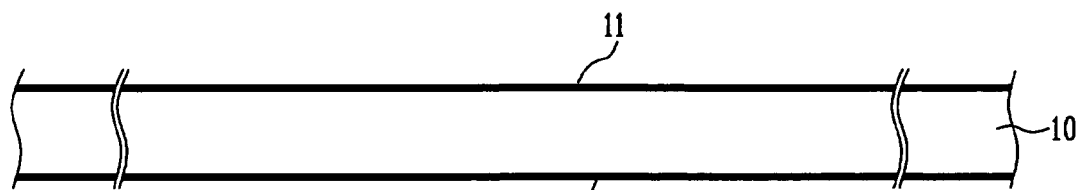
FIGS. 3A to 3D illustrate sectional views of stages in a fabricating method of a touch screen panel according to an embodiment.

Referring to FIG. 3A, the reinforcement may be performed on an original or uncut glass substrate 10, i.e., a whole surface of the glass substrate 10 on which a plurality of touch screen panels will be formed in the form of unit cells.

As described above, the reinforcement of the glass substrate 10 may be performed by, e.g., soaking the glass substrate 10 in a $KNO_3$ solution and then heating the same at about 400° C. to about 450° C. for about 15 to about 18 hours. By performing such a process, a sodium (Na) component existing on the surface of the glass substrate 10 may be replaced with a potassium (K) component, so that strength of the surface of the glass substrate may be improved. That is, after the reinforcement is performed, a reinforcing layer 11 may be formed on the surface of the reinforced glass substrate 10. However, the embodiments are not limited thereto.

Figure 3B:
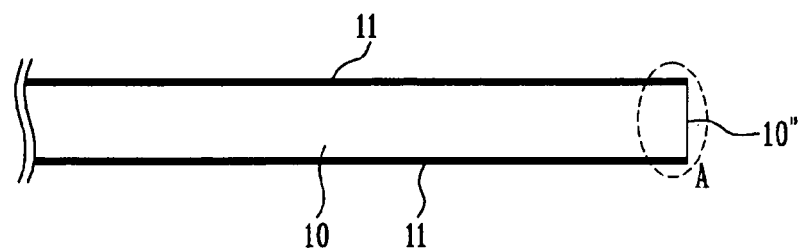

As illustrated in FIG. 3B, the reinforced original glass substrate 10 may be cut into respective unit cells.

However, FIG. 3B illustrates only one side cut portion of the unit cell.

The cutting may be implemented by a physical and/or a chemical method, e.g., a wheel, laser, water jet, and/or etching.

However, as the cutting is performed, in the cutting section A, an unreinforced section 10" in which minute cracks exist, as illustrated in FIG. 3B, may be exposed and the minute cracks may detract from reliability.

Therefore, in the present embodiment, the healing may be performed on the unreinforced section 10" to guarantee reliability of a resultant product.

That is, the minute cracks in the cutting section may be removed or dented to obtain increased strength.

In the present embodiment, when the healing process is performed, a viscous etching paste may be printed on a region including the section A such that etching may be performed on the section A having the minute cracks. In addition, the printed region may be heated. That is, the etching may be performed on the section so that the minute cracks are removed or dented and the section is changed to obtain the increased strength.

Figure 3C:
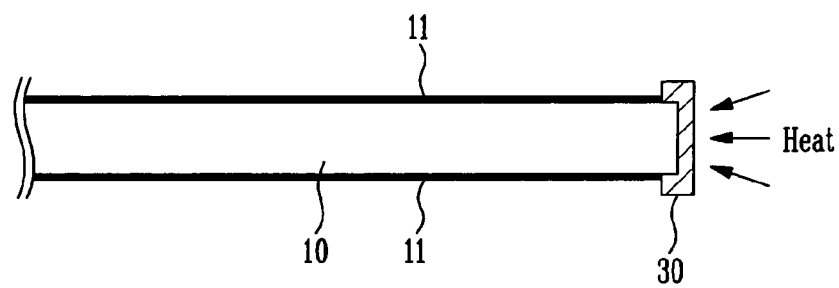

In particular, referring to FIG. 3C, after cutting the glass substrate 10 on which the reinforcing layer 11 is formed, the viscous etching paste 30 may be formed to wrap the cutting section.

The reinforcing layer 11 on the cutting section may be minutely removed prior to forming the etching paste 30; and the etching paste 30 may be conformally formed to cover the glass substrate exposed by the removed reinforcing layer.

The etching paste 30 may include, e.g., $SiO_2$, $SiO_xN_y$, and/or $NH_4HF_2$.

The etching paste 30 may be formed on the cutting section by, e.g., a printing process, and may be heated after the printing process is completed so that the etching is chemically performed on the cutting section.

By performing the etching, sharp inner portions of the minute cracks generated in the cutting section may be dented and/or polished smoothly or an outer region of the cutting section where the minute cracks are generated may be removed.

Figure 3D:
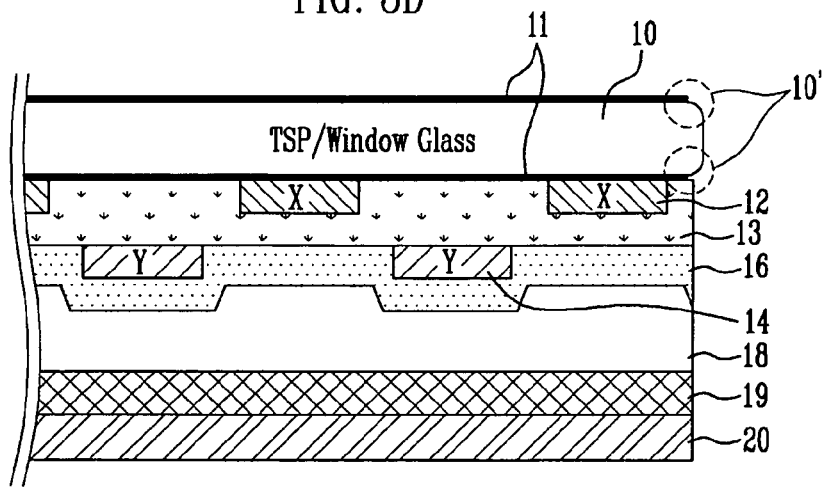

When the etching is performed on the cutting section, as illustrated in FIG. 3D, an edge portion 10' of the cutting section may have a rounded shape.

That is, according to the present embodiment, the viscous paste-type etching material may be used to simplify a process. A heating time of the paste may be adjusted to control an etching level thereof.

As described above, when the healing of the cutting section of the reinforced glass substrate is completed, sensing electrodes of the touch screen panels may be formed in the unit cells.

That is, as illustrated in FIG. 3D, the X-sensing patterns 12, the first insulating layers 13, the Y-sensing patterns 14, the second insulating layers 16, the first bonding layers 18, the buffer films 19, and the ground electrode layers 20 may be sequentially formed in the respective unit cells on the reinforced original glass substrate 10.

In more detail, a transparent material, e.g., ITO may be coated on the respective unit cells; and the coated films may be patterned to form the X-sensing patterns 12. Although connecting portions of the X-sensing patterns 12 are not illustrated, the X-sensing patterns 12 may be patterned to be connected to each other in the first direction (e.g., in the row direction) with respect to the unit cell.

After that, a first insulating material may be printed and plasticized by a printing technique enabling relative easy process to form the first insulating layer 13. The formation of the first insulating layer 13 using the printing technique is only an example, and the embodiments are not limited thereto. For example, the first insulating layer 13 may be formed by CVD or sputtering.

Next, a transparent material, e.g., ITO may be coated on the first insulating layer 13 and may be patterned to form the Y-sensing patterns 14. The Y-sensing patterns 14 may be arranged to avoid overlapping with the X-sensing patterns 12 (but, the connecting portions of the Y-sensing patterns 14 may be excluded, i.e., may overlap.) Although not illustrated, the Y-sensing patterns 14 may be patterned to be connected to each other in the second direction (e.g., in the column direction). After forming the Y-sensing patterns 14, a low-resistance material having resistance lower than that of the transparent material, e.g., a triple layer made of molybdenum, aluminum, and molybdenum, or a chromium layer may be used to further form the metal patterns 15 and a position detecting line (not shown) as illustrated in FIG. 1.

After that, a second insulating material may be printed and plasticized on the Y-sensing patterns 14 and the metal patterns 15 using the printing technique to form the second insulating layer 16. The method of forming the second insulating layer 16 is not limited to the printing technique, but the second insulating layer 16 may be formed using, e.g., CVD or sputtering.

The first bonding layer 18, the buffer film 19, and the ground electrode layer 20 may be sequentially formed on the second insulating layer 16.

In this case, the first bonding layer 18 may be made of transparent bonding material having high light transmission, e.g., super view resin (SVR) or optically clear adhesive.

The ground electrode layer 20 may be made of a transparent material, e.g., ITO, and may be used to secure stability between the touch screen panel and the display panel or to generate electrostatic capacity in association with the sensing patterns 12 and 14 according to a designing method of the touch screen panel. That is, in the capacitive touch screen panel, the electrostatic capacity between the X- and Y-sensing patterns 12 and 14 and the ground electrode layer 20 may be used to sense a contact position.

In addition, the buffer film 19 between the first bonding layer 18 and the ground electrode layer 20 may be made of polymer material, e.g., polyethylene terephthalate (PET), to increase durability of the touch screen panel, e.g., to prevent scattering, and to increase sensitivity of the touch screen panel.

In order to use a reinforced glass substrate, the glass substrate may be cut into several unit cells and the unit cells may go through a reinforcing process. In the fabrication of a touch screen using the glass substrate according to an embodiment, it may be easy to guarantee mass production by performing the reinforcing process on the original glass substrate.

Because the touch screen panel is made from the original glass substrate that has been reinforced, the touch screen panel may have excellent breaking strength and superb reliability.

In particular, according to the embodiments, the reinforcing process of the glass substrate may be performed and the healing process may be performed on unreinforced surfaces of the exposed glass substrate after cutting, i.e., the cross-sections. Accordingly, minute cracks on the cross-sections may be removed to guarantee breaking strength and mass productivity of the touch screen panel.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of fabricating a touch screen panel, the method comprising:
   performing a reinforcing process on whole surfaces of a glass substrate in preparation for forming a plurality of touch screen panels to produce a reinforced glass substrate;
   cutting the reinforced glass substrate into unit cells;
   performing a healing process on an unreinforced cutting section of the glass substrate exposed after the cutting, wherein performing the healing process includes:
      providing a viscous etching paste to a region of the glass substrate including the unreinforced cutting section to wrap the unreinforced cutting section; and
      heating the etching paste; and
   forming the touch screen panels in the unit cells.

2. The method of fabricating a touch screen panel as claimed in claim 1, wherein the etching paste includes at least one of $SiO_2$, $SiO_xN_y$, and $NH_4HF_2$.

3. The method of fabricating a touch screen panel as claimed in claim 1, wherein forming the touch screen panels in the unit cells includes sequentially forming X-sensing patterns, Y-sensing patterns, a second insulating layer, a first bonding layer, a buffer layer, and a ground electrode layer on each of the unit cells of the reinforced original glass substrate.

4. The method of fabricating a touch screen panel as claimed in claim 1, wherein the reinforcing process includes:
  soaking the glass substrate into a $KNO_3$ solution, and
  heating the $KNO_3$ solution at about 400° C. to about 450° C. for about 15 to about 18 hours.

5. The method of fabricating a touch screen panel as claimed in claim 4, wherein the reinforcing process includes replacing a sodium component in the glass substrate with a potassium component.

6. A touch screen panel, comprising:
  a glass substrate having a first surface and a second surface including reinforcing layers thereon;
  sensing patterns on the first surface of the glass substrate; and
  an insulating layer covering the sensing patterns;
  wherein the glass substrate includes an edge portion, the edge portion having a rounded shape on an unreinforced surface exposed at a side of the glass substrate, and
  further wherein the glass substrate including the reinforcing layer thereon is a window substrate disposed uppermost among substrates to be included in an image display device.

7. The touch screen panel as claimed in claim 6, further comprising a ground electrode layer facing a bonding layer on a side of the insulating layer.

8. An image display device, comprising:
  a glass substrate having a first surface and a second surface including reinforcing layers thereon;
  sensing patterns on the first surface of the glass substrate;
  an insulating layer covering the sensing patterns; and
  a display panel disposed adjacent to the insulating layer, the display panel being disposed at an opposite side of the insulating layer from the side having the sensing patterns,
  wherein the glass substrate includes an edge portion, the edge portion having a rounded shape and an unreinforced surface exposed at a side of the glass substrate, and
  further wherein the glass substrate including the reinforcing layer thereon is a window substrate disposed uppermost among substrates to be included in an image display device.

* * * * *